K. H. WHITNEY

Dec. 2, 1930. SUPPORTING BRACKET FOR WINDOW HANGINGS Re. 17,896

Original Filed Feb. 3, 1925

Inventor

Karl H. Whitney

By

Attorney

Reissued Dec. 2, 1930 Re. 17,896

UNITED STATES PATENT OFFICE

KARL H. WHITNEY, OF KIRKSVILLE, MISSOURI, ASSIGNOR TO WHITNEY MANUFACTURING COMPANY, OF KIRKSVILLE, MISSOURI, A CORPORATION OF MISSOURI

SUPPORTING BRACKET FOR WINDOW HANGINGS

Original No. 1,573,286, dated February 16, 1926, Serial No. 6,579, filed February 3, 1925. Application for reissue filed February 15, 1928. Serial No. 254,571.

The present invention relates to supporting brackets for window hangings, and aims to provide a novel and improved device of that character which may be readily attached to a window frame without damaging or marring the woodwork, said device being so constructed as to permit the same to be secured to window frames of various widths.

Another object of the invention is the provision of brackets which are adjustable to accommodate shade rollers or curtain poles of different lengths, the object being to produce a bracket which may be readily adjusted when the same is firmly secured in position on the window frame.

A further object of the invention is to provide a device which may be clamped in a rigid manner to window frames without the use of securing elements such as screws, nails, and the like, said device being so arranged as to firmly engage a window frame should the surface of the frame contacting with my improved device be uneven or irregular.

It is also an object of the invention to provide a bracket for window hangings, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

Figure 1:
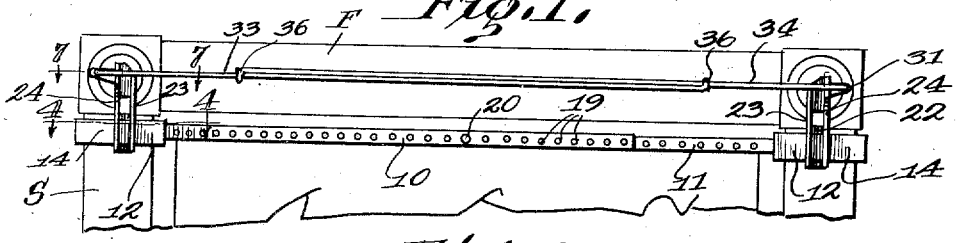
Figure 2:
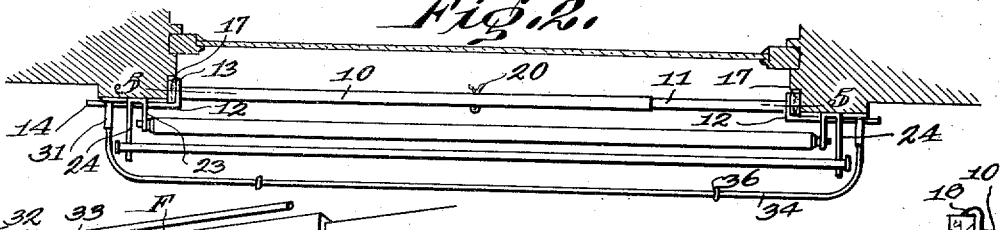
Figure 3:
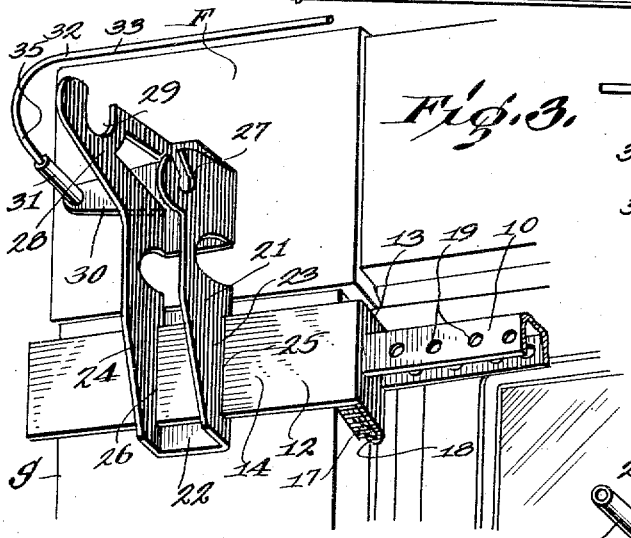
Figure 7:
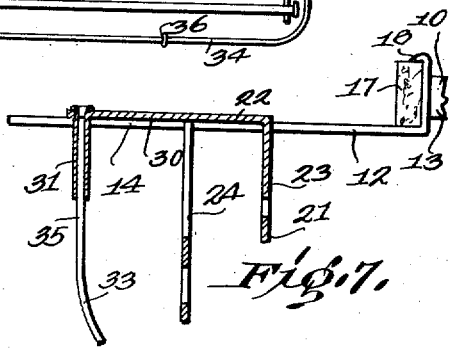
Figure 8:
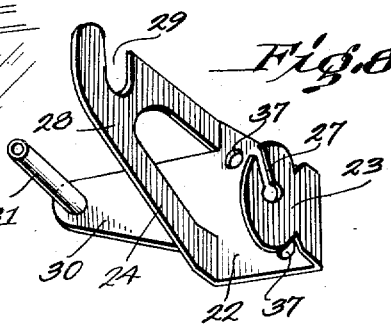
Figure 4:
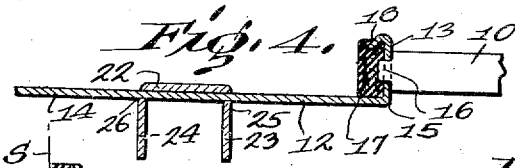
Figure 5:
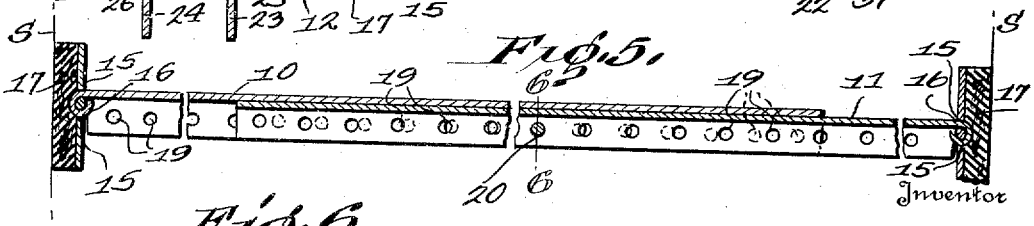
Figure 6:
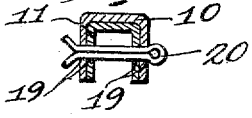

The invention is illustrated in the accompanying drawings, wherein:

Figure 1 is a fragmentary side elevation of a window frame showing my improved device applied, Figure 2 is a horizontal section through the window frame looking down on my improved bracket, Figure 3 is a perspective view of one end of the bracket showing the same clamped to a window frame, Figure 4 is a section on line 4—4 of Figure 1, Figure 5 is a vertical section on line 5—5 of Figure 2, Figure 6 is a cross section on line 6—6 of Figure 5, Figure 7 is a horizontal section taken on line 7—7 of Figure 1, and Figure 8 is a perspective view of a slightly modified form of my invention.

In carrying out the invention, the letter F designates a window frame having the side facing strips S to which my device is to be attached. Arranged to extend between the two facing strips S is a pair of channel irons 10 and 11, the channel iron 11 being of a smaller size and arranged within the channel iron 10 for longitudinal sliding movement. At the outer ends of the channel irons 10 and 11 are provided angle members 12, each composed of a short side 13 extending parallel with the inner edges of the facing strips S and a side portion 14 extending across the face of one facing strip. The manner of attaching the angle members 12 to the channel members 10 and 11 being to provide a pair of slots 15 in each of the short sides 13 of the angle members for receiving curved tongues 16 extending outwardly from the bight portions of the channel members. It can be seen that by extending the curved tongues 16 through both slots 15 in the angle members 12 that said angle members will have a certain amount of pivotal movement with relation to the channel members. Positioned on the faces of the side portions 13 of the angle members 12 adjacent the edges of the facing strips S are soft pads 17 arranged for contacting with the edges of said facing strips. The soft pads 17 are constructed of spongy rubber, or the like, and are attached to the angle members by bending the free ends of the sides 13 inwardly so as to be forced into the soft pads, as indicated by the numeral 18. Arranged in the side portion of each channel member are a series of openings 19, the openings in the two side portions of each channel member aligning with each other, while the openings 19 in one channel member are spaced slightly farther apart than in the other channel member in order to align openings in both channel members independently of the longitudinal position of said channel members. A cotter pin 20 is inserted through the aligning openings of both channel members in order to hold said channel members against movement with relation to each other, which will hold the soft pads 17 in tight engagement with the edges of the facing strips S of the window frame.

Carried by the portions 14 of each angle member 12 is a bracket 21 having a back portion 22 and forwardly extending side portions 23 and 24, said brackets being carried by the portions 14 by providing slots 25 and 26 in the side portions 23 and 24 adjacent the back portion 22 through which said portions 14 extend. The forwardly extending side portion 23 of each bracket 21 has either a slot or aperture 27 arranged in the upper portion thereof for supporting one end of a shade roller, while the forwardly extending side portions 24 have the upper portions thereof extending forwardly a greater distance, as indicated by the numeral 28 for receiving the opposite ends of a curtain pole in the recesses 29 extending downwardly from the upper edge thereof. Cut from the side portions 24 and bent to extend parallel with the back portions 22 are outwardly extending lugs 30, each having a forwardly extending tubular member 31 secured to its outer end for receiving one end of a drapery supporting wire 32.

The drapery supporting wire 32 is composed of two sections 33 and 34, each having one end thereof bent at right angles as at 35 for engaging in one of the tubular members 31 of either of the brackets 21. On the opposite ends of the sections 33 and 34 are provided eyes 36 for slidably receiving the other section from which the same is formed. It will be noted that by constructing a drapery wire as above set forth that the same will be adjustable to windows of various widths.

In operation, my improved supporting bracket is first placed between the two side facing strips S, and the channel members 10 and 11 slide longitudinally with relation to each other until the pads 17 are brought in tight engagement with the inner edges of the facing strips. The cotter pin 20 is then inserted through the aligning apertures 19 in both channel members in order to hold the channel members in locked position. As a certain amount of pivotal movement is permitted between the channels and the angle members 12 the pads 17 will at all times and under all conditions snugly contact with the facing strips. The brackets 21 are then moved towards or away from each other in order to accommodate the shade roller which can be of various lengths with relation to the width of the window frame. The opposite ends of a curtain pole can then be placed within the recesses 29 in the forwardly extending side portions 24, the length thereof being immaterial, as the same can extend any distance beyond said side portions.

By constructing the members 10 and 11 of channel cross-section from metal, and so as to nest one within the other and having a series of perforations in at least one thereof, said members are adapted to be produced in quantity of a maximum strength, of substantially uniform strength one set with another, and to be readily and relatively adjusted as to length to meet a relatively wide range of conditions of attachment. Such members have little tendency to warp or shrink, and hence retain their adjusted positions.

In Figure 8 is illustrated a modified form of my invention, in which form the angle members 12 and the channel members 10 and 11 are eliminated, the brackets being attached to the window frame by merely placing screws or nails through the openings 37 arranged in the back portions 22 thereof. The shade roller, curtain pole, and drapery wire supporting means being identical to the preferred form of my invention.

Having thus described my invention, what I claim as new is:

A window hanging support comprising a pair of bracket members having angularly disposed end portions, a resilient pad applied to the inner surface of one end portion of each bracket member, each of said end portions being provided with parallel slots, and slidable rail sections each having an end portion passing through the slots of the respective bracket members whereby the rail section is pivotally connected with the respective bracket members, the said end portion of the rail section engaging in the side surface of the pad.

In testimony whereof I have hereunto affixed my signature.

KARL H. WHITNEY.